May 13, 1952     A. A. HOLBECK     2,596,404

BAKING OVEN LOADING APPARATUS

Filed Jan. 4, 1951     2 SHEETS—SHEET 1

INVENTOR.
Austin A. Holbeck
BY
Barnes, Kisselle, Laughlin & Raisch
Attorneys.

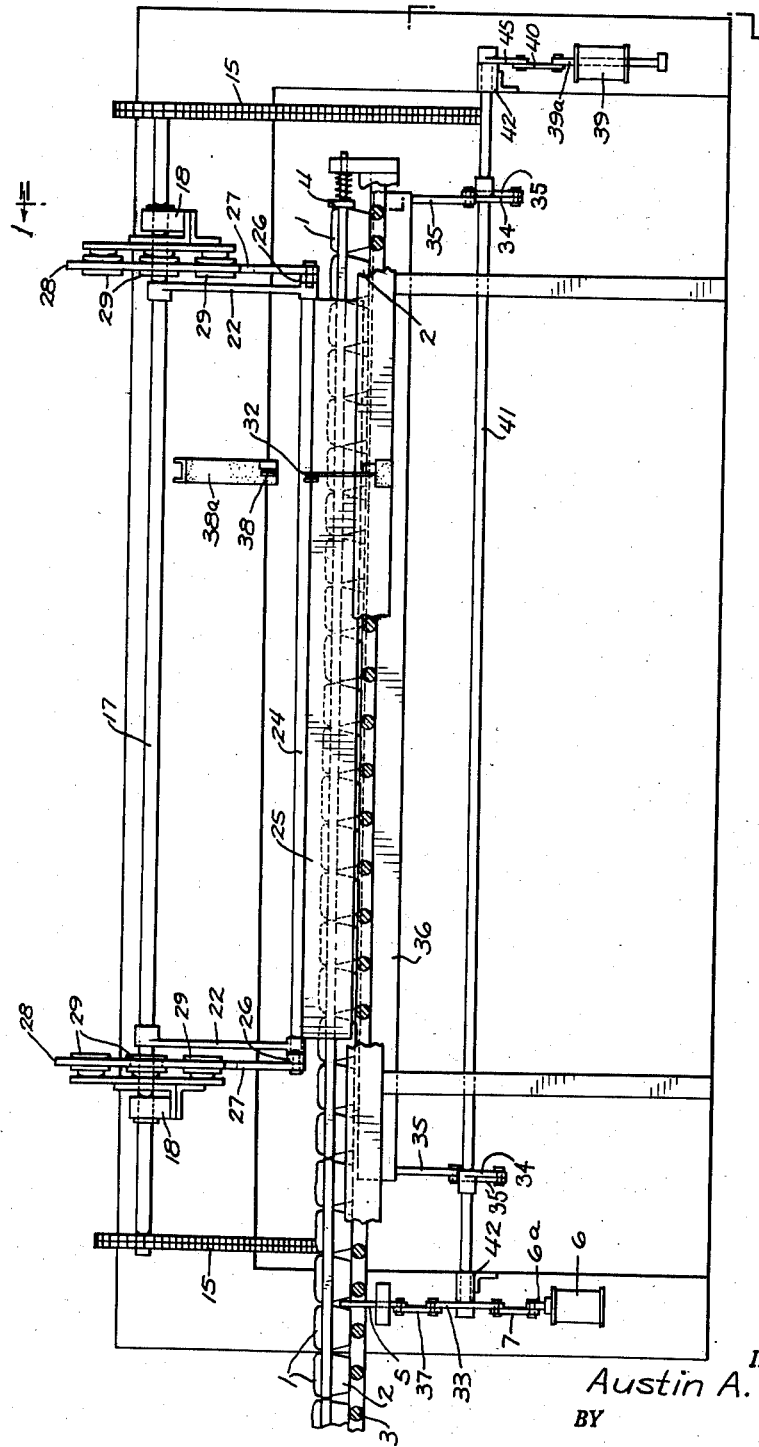

Patented May 13, 1952

2,596,404

UNITED STATES PATENT OFFICE 2,596,404

BAKING OVEN LOADING APPARATUS

Austin A. Holbeck, Detroit, Mich.

Application January 4, 1951, Serial No. 204,434

9 Claims. (Cl. 198—31)

This invention relates to baking oven loading apparatus. Ordinarily ovens for baking bread are loaded by hand. It is the object of the present invention to provide apparatus for quickly and reliably loading baking ovens. It materially cuts down the labor cost of baking bread or other products.

Referring to the drawings:

Fig. 3 is a front elevation of the apparatus.

Figure 1:
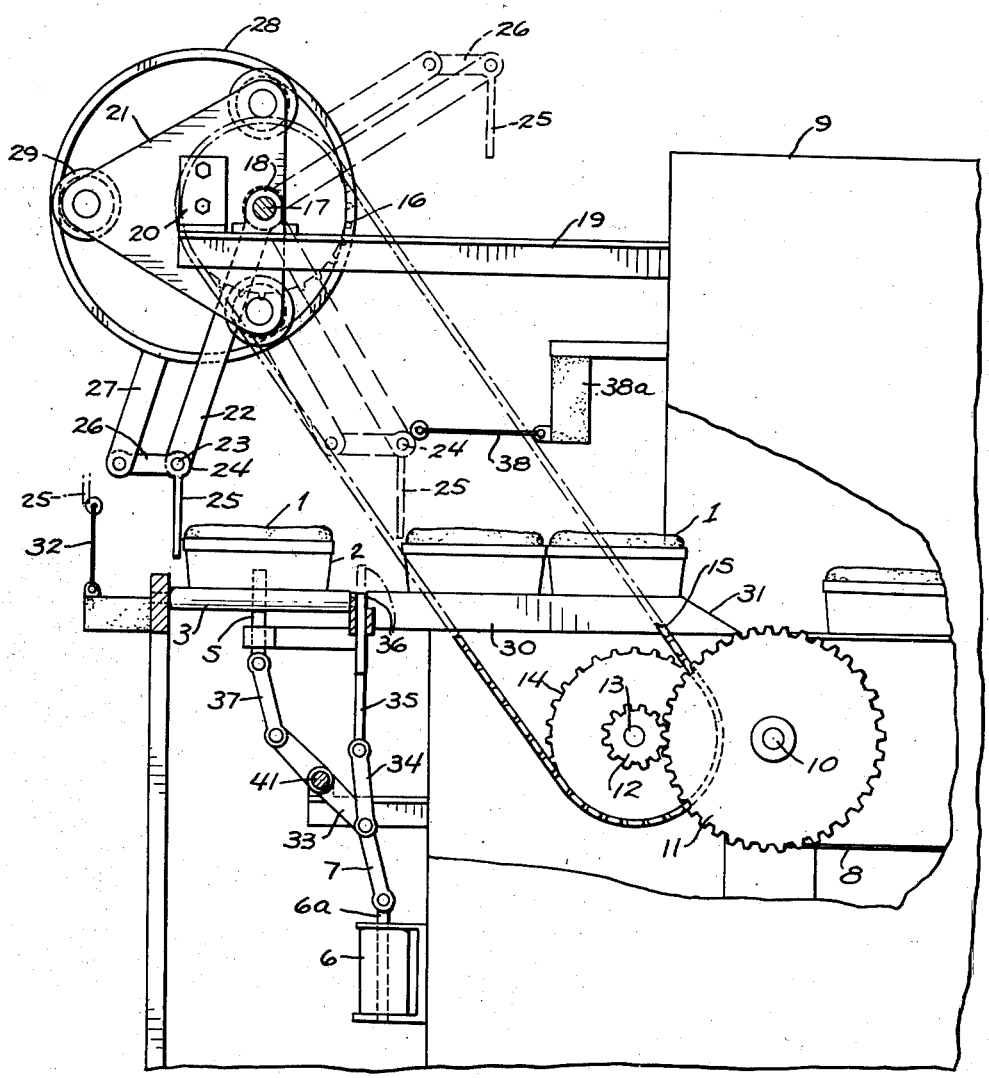
Fig. 1 is a side elevation of the apparatus.

1 designates the loaves of bread contained in pans 2. These are shoved along the roller conveyor 3 by means of pushing apparatus, not shown. The pans are pushed along the roller conveyor and the last loaf 1, to the right in Fig. 3, is stopped by a spring backed buffer block 4. When a full line of bread pans is in front of the mouth of the oven a pin 5 is pushed up by the energization of solenoid 6, the armature 6a of which, through mechanical connections to be later described, causes the pin 5 to engage between the pans so that no bread will be pushed into place in front of the oven while the loading operation is pushing a line of pans into the oven.

8 designates the conveyor in the oven 9 which may be either a gas or electrically heated oven, or, preferably, an infra-red ray oven. At one end of the oven is a shaft 10 on which is located the pulley wheel over which passes the conveyor belt 8. On the ends of this shaft are the gears 11 which mesh with the pinions 12 on the shaft 13 which also bears the sprocket wheels 14. These sprocket wheels 14 carry the chains 15 which drive the sprocket wheels 16 on the shaft 17 supported in the journal bearings 18 on the angle iron brackets 19 to which are bolted the angle irons 20 which support the triangular plates 21.

Fastened to the shaft 17 are the radial arms 22. These radial arms 22 carry the shaft 23 which engages in the hub 24 of the pusher strip 25. Integrally formed to the ends of the pusher strip 25 in a fixed right angular relation are the arms 26. These arms, when the loading apparatus is viewed in side elevation as shown in Fig. 1, make, when combined with the pusher strip, bell crank arms. Pivoted to the end of each arm 26 is another radial arm 27 which is fastened to hoop 28 which in turn is guided in the grooved trunnion rolls 29 which are supported to rotate on the triangular plate 21. This radial arm 27 has its center of rotation at the geometric center of the hoop 28. The hoops 28 are necessary in order to support the radial arms 27 for rotation and permit these radial arms each to make a complete rotation without running into the shaft 17, which would otherwise occur if its center of rotation were differently located.

The function of these radial or parallel arms 22 and 27 is to cause the pusher strip 25 and its arms 26 to always keep the same angular position—the pusher strip vertical and the arms 26 horizontal, in a cycle of travel around the two centers of the two pairs of radial arms. These vertical and horizontal positions of the strips 25 and the arms 26 is shown by the dotted lines in Fig. 1.

This enables the pusher to at all times bear flat against the pans in pushing the pans off the roller conveyor rolls 3 onto the oven hearth 30. As shown in Fig. 1, there are two lines of pans on the hearth 30. When the next line of pans, as shown in Fig. 1, is pushed by the pusher strip 25 off the roller conveyor, it will push the two lines of pans on the hearth forward and one of the lines of pans will slide down an incline 31 onto the conveyor 8 and will start on its way through the baking oven 9.

Shortly before the pusher strip 25 is about to hit the line of pans on the roller conveyor 3, it strikes the limit switch 32 and temporarily closes that switch which is in a circuit to solenoid 6. This energizes the solenoid pulling down on the link 7 which pulls down the right hand end of the lever 33. This pulls down links 34 which in turn pull down the rods 35 which are attached to the movable guide rail 36. The left hand end of the lever goes up and pushes up the link 37 and pushes the stop pin 5 up to arrest any further pans being pushed in front of the mouth of the oven while one line of pans is being pushed into the oven. When the pusher strip 25 leaves the pans and starts its upward travel as shown in the first dotted line showing to the right in Fig. 1, it strikes the spring arm 38 of the limit switch 38a and thereby closes the switch in the holding solenoid circuit 57. Fast to shaft 41 are crank arms 34 which are connected to links 35. This shaft 41 is fastened to the lever 33 (Fig. 1) which is pulled down by solenoid 6 when limit switch 32 is temporarily energized. When the solenoid 39 is actuated its armature 39a pushes up the link 40 and through the crank arm 45 rotates shaft 41 to push up on the rods 35 and raise the guide rail. At the same time the left hand end of lever 33 is pulled down and that pulls the stop pin 5 downward out of the way of the bread pans that are being pushed along the roller conveyor.

When the limit spring switch arm 32 is temporarily tripped this not only energizes the solenoid 6 but it deenergizes the holding solenoid circuit 57 for the other limit switch and thereby allows the second limit switch 38 to open and deenergize the circuit through the solenoid 39 releasing the armature 39a which keeps the crank arms 43 in their upper position to hold the pin 5 down and the guard rail up.

Figure 2:
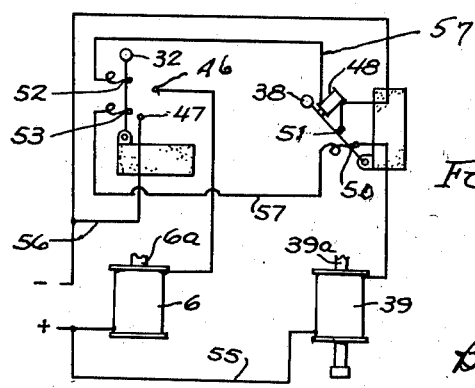
Fig. 2 is a diagrammatic view of the limit switches, the circuits, and the solenoids.

The operation of the limit switches and the solenoids and the hold-over for the second limit switch is shown in the wiring diagram (Fig. 2). The solenoid 6 has a winding forming a part of a circuit having leads 55 and 56 connected to a source of electric current (not shown) and provided with the two switch contacts 46 and 47. The hold-over circuit 57 and the solenoid 39, circuit 55, have in common the contacts 50 and 51 closed by switch arm 38. The hold-over circuit 57 has contacts 52 and 53 which are normally closed by the spring limit switch arm 32 as shown in Fig. 2. When the switch arm 32 is tripped, this opens the hold-over circuit at the contacts 52 and 53, deenergizing the hold-over solenoid 48 and the second limit switch arm 38 springs open, opening the switch at the contacts 51 and 50, and opening the circuit 55 and thereby deenergizing solenoid 39 which permits the pin 5 to be pushed up and the guard rail 36 to be pulled down by the armature of solenoid 6 when the circuit 56 is closed by the first mentioned limit switch 32 bridging the contacts 46 and 47. This is only momentary energization and when the push strip 25 passes the top of the upper limit switch 32, this switch swings open again and closes the hold-over circuit at points 52 and 53. Then when the push strip 25 closes the second limit switch 38 as shown in Fig. 2, this closes the hold-over circuit 57 and energizes the solenoid 39 and the hold-over solenoid 48 and keeps the limit switch arm 38 in closed position keeping the solenoid 39 energized to keep the pin 5 down and the guard rail up until such time as the hold-over circuit is broken at the points 52 and 53 by the actuation of the first limit switch 32.

The guard rail 36, when in raised position, operates in conjunction with the long pusher bar 25 to guide or channel the pans across the mouth of the oven in position to be pushed, a whole line, sidewise into the oven when the guard rail is lowered.

What I claim is:

1. Baking oven loading apparatus having in combination, a carrier onto which a line of baking pans and products to be baked can be brought to the mouth of the oven, a guard rail on the oven side of said carrier, said guard rail movable up and down, means for pushing a line of baking pans and products to be baked toward the mouth of the oven, a stop member that can be raised just before the pushing apparatus starts to push to prevent further pans being brought in front of the oven, and means operated by the pushing means for coincidentally pulling down the guard rail and pushing up the stop member just as the pushing means starts to push the line of pans and products to be baked toward the oven.

2. The combination claimed in claim 1 in which the pushing means is a strip which periodically pushes the pans toward the oven.

3. The combination claimed in claim 1 in which the pushing means is a cyclically operated pushing strip which periodically appears in front of the pans to push the pans and the products to be baked toward the oven.

4. The combination claimed in claim 1 in which the pushing means is a pushing strip in combination with bell crank arms which are operated by parallel radial arms to keep the pushing strip at all times in vertical position.

5. The combination claimed in claim 4 in which the parallel radial arms have different centers, one set of arms being supported on a shaft with one center and the other set of arms being supported on hoops which have a different geometric center.

6. The combination claimed in claim 5 in which the hoops are supported on grooved trunnions on a supporting plate.

7. The combination claimed in claim 1 in which the means for pulling down the guard rail and raising the stop member is a limit switch and circuit, a solenoid and mechanical connections between the armature of the solenoid and the stop member and the guard rail.

8. The combination claimed in claim 1 in which there is also means for pulling down the stop member and raising the guard rail.

9. The combination claimed in claim 1 in which there is means for both raising and lowering the stop member and the guard rail, which comprises two limit switches operated by the cyclically operating push member and solenoids with circuits including a holding solenoid and circuit controlled by the limit switches, the said solenoids having armatures with mechanical connections with the stop member and guard rail.

AUSTIN A. HOLBECK.

REFERENCES CITED

The following references are of record in the file of this patent:

UNITED STATES PATENTS

| Number | Name | Date |
| --- | --- | --- |
| 1,289,208 | Lents | Dec. 31, 1918 |
| 1,795,352 | Sundbom | Mar. 10, 1931 |